United States Patent [19]

Ando et al.

[11] 4,371,741
[45] Feb. 1, 1983

[54] COMPOSITE SUPERCONDUCTORS

[75] Inventors: Toshinari Ando; Masataka Nishi; Susumu Shimamoto, all of Tokaimura; Hiromichi Yoshida, Hitachi; Takashi Suzumura, Hitachi; Kimio Kakizaki, Hitachi; Ryozo Yamagishi, Hitachi; Hisanao Ogata, Shimoinayoshi, Japan

[73] Assignees: Japan Atomic Energy Research Institute; Hitachi Cable, Ltd., both of Tokyo, Japan

[21] Appl. No.: 233,282

[22] Filed: Feb. 10, 1981

[30] Foreign Application Priority Data

Feb. 12, 1980 [JP] Japan ............................... 55-14788

[51] Int. Cl.³ ........................ H01B 7/34; H01B 12/00
[52] U.S. Cl. .................................. 174/15 S; 24/599; 174/126 S; 174/128 S
[58] Field of Search .......... 174/126 CS, 126 S, 128 S, 174/15 S, 15 R, 15 CA, 15 C, 126 R, 128 BL; 428/156, 172, 163, 167, 169; 29/599; 165/179

[56] References Cited

U.S. PATENT DOCUMENTS

| 3,332,047 | 7/1967 | Borchert ........................ 174/126 S |
| 3,354,021 | 11/1967 | Roget ............................ 174/15 S |
| 3,408,238 | 10/1968 | Berghout et al. ............. 174/126 S |
| 3,428,925 | 2/1969 | Bognes et al. ................. 335/216 |
| 3,735,018 | 5/1973 | Griesinger .................... 174/15 S |
| 4,334,123 | 6/1982 | Tadu et al. .................... 174/15 S |

FOREIGN PATENT DOCUMENTS

| 1665555 | 6/1971 | Fed. Rep. of Germany ... 174/128 S |
| 46-696 | 1/1971 | Japan .............................. 174/126 S |
| 47-25274 | 3/1972 | Japan . |
| 49-60884 | 6/1974 | Japan . |
| 53-70695 | 6/1978 | Japan . |

Primary Examiner—Stanley S. Silverman
Attorney, Agent, or Firm—Wenderoth, Lind & Ponack

[57] ABSTRACT

A novel composite superconductor includes a superconducting material and a normal conducting material. The composite superconductor has a number of closely spaced grooves on a surface being in contact with a refrigerant, and a number of ridges spaced apart from each other by the grooves and having acutely tapered ends. The surfaces of the grooves and the ridges are coated with a thin film of metal or its compound having higher heat resistance than that of the surface of the composite superconductor. Consequently, a high critical heat flux in film boiling and a high cooling capability can be provided, thereby making it possible to decrease the sectional area of the normal conducting material, to increase the effective current density and to miniaturize the size of a magnet.

9 Claims, 2 Drawing Figures

F I G. 1
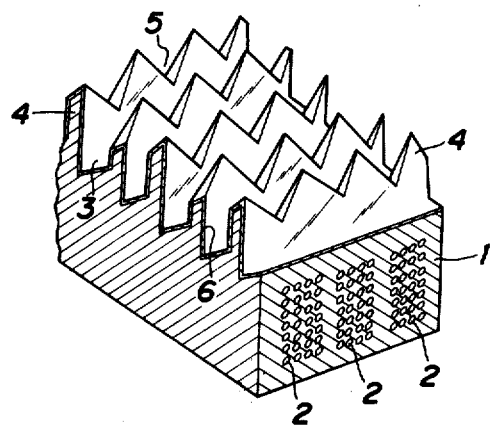
F I G. 2
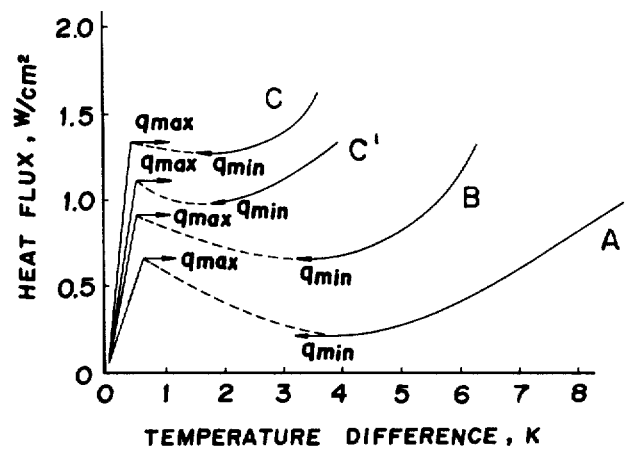

COMPOSITE SUPERCONDUCTORS

BACKGROUND OF THE INVENTION

The present invention relates to a composite superconductor used for a superconducting transmission line, a variety of superconducting magnets and the like.

A composite superconductor consists of a super-conducting material and a normal conducting material, and it is finished into a round, flat or hollow type wire, for example, by burying superconducting wires of about 5 to 250 μm diameter into the normal conducting material such as copper, aluminium or other metals, or alloys thereof. Having superconductivity, such a finished wire does not generate heat under a definite magnetic field and a definite electric current. However, temporal changes of an applied current bring about a loss accompanied by magnetization. If breakdown of the superconductivity should happen for some cause, a large quantity of Joule heat would be evolved.

For these reasons, a portion of the composite superconductor is utilized as a cooling face or surface which is directly in contact with a refrigerant, for example liquid helium, to cool the superconductor.

Upon a breakdown of the superconductivity, the conditions to prevent the spread of a normal conducting range evolving Joule heat can be represented by the following equation:

$$\rho \cdot I^2 / A \cdot P \cdot q < 1 \qquad (1)$$

where $\rho$ is the electrical resistivity of a normal conducting material, I is an applied current, P is the cooling perimeter, A is the cross-sectional area, and q is heat flux.

As is understandable from the above equation (1), in order to raise the electric current, it is necessary (a) to provide the normal conducting material having a low electrical resistivity $\rho$ and a large cross-sectional area A, or (b) to raise the cooling capability $P \times q$. The former solution (a) is limited from the viewpoint of the quality of the normal conductor or of the design for the composite super-conductor, and hence, one cannot help directing the subject of his endeavors to the latter solution (b).

As one example of this countermeasure, a method is well known which comprises forming a number of rectangular sectional grooves of about 1 mm depth and about 1 mm width in the surface of a conductor coming into contact with liquid helium to increase the perimeter P. It has also been tried to provide cellulose coatings on the surface of a conductor. However, the improvement of the cooling capability is not yet sufficiently carried out.

SUMMARY OF THE INVENTION

It is therefore an object of the present invention to provide a composite superconductor which has a large cooling capability, and hence makes it possible to decrease the cross-sectional area of a normal conducting material and to increase the effective current density.

According to the present invention, the composite superconductor comprising a superconducting material and a normal conducting material has a number of closely spaced grooves on a substrate surface being in contact with a refrigerant and a number of ridges closely spaced apart from each other by the grooves and having acutely tapered ends. The substrate surfaces of the grooves and ridges are coated with a thin film comprising metal or its compound having a higher heat resistance than that of the substrate, thereby making it possible to maintain nuclei boiling effective to heat transfer with a refrigerant, and to revert even from a normal conducting state induced by some cause into a superconducting state.

BRIEF DESCRIPTION OF THE DRAWINGS

FIG. 1 is a perspective view of a composite superconductor embodying the present invention: and FIG. 2 is a diagram showing the characteristics of a cooling face of the composite superconductor shown in FIG. 1.

DESCRIPTION OF THE PREFERRED EMBODIMENTS

Referring now to FIG. 1, a composite superconductor according to the present invention is formed into a flat type wire and one side of section of the substrate is worked as a cooling face or surface. For example, on the substrate surface corresponding to the cooling face of a composite superconductor comprising a normal conducting material 1 such as the high purity copper known by the trademark OFHC, into which a number of fine superconducting wires 2 such as Nb-Ti wires are buried, are formed a number of grooves 3 crossing the composite superconductor and arranged substantially parallel and closely spaced apart with respect to each other, and a number of ridges 4 spaced apart from each other by the grooves 3 and arranged substantially parallel to each other. Each ridge 4 has an acute tip into which is cut a plurality of V-shaped notches 5 shallower than the grooves 3. The cooling surface or face thus roughened is then coated with a thin film of copper oxide.

Such a surface structure can be obtained by the following working and treatment:

On a smooth substrate surface corresponding to a cooling side or face of a composite superconductor are formed a plurality of first V-shaped sectional grooves, and then a plurality of second grooves, deeper than the first grooves, are formed in directions crossing the first grooves by cutting as in plowing. Upon forming these second grooves, as shown in FIG. 1, the grooves 3 deeper than the first grooves are formed by employing a cutting operation as in plowing, and on the ridges spaced apart from each other by the grooves 3 are formed a plurality of V-shaped notches 5 which are the remains of the first grooves. When the first grooves have a 0.6 mm pitch and a 0.4 mm depth, and the second grooves have a 0.2 mm width, a 0.8 mm depth and a 0.4 mm pitch, the surface area is increased about 3.5 times that of the original smooth surface, and the surface area with no first grooves is increased about 3.0 times.

After such a surface working, the worked surface was treated by an anodic oxidation process using a bath containing an aqueous solution of sodium hydroxide heated to about 90° C. to form a thin coating or film 6 of copper oxide on the worked surface corresponding to a cooling face.

Such a coating or film 6 was also obtained by heating the worked surface, for example, for 5 minutes at 400° C. and 10 hours at 150° C. in an air furnace after surface working.

Referring to FIG. 2, the effects of the cooling face thus obtained will be described below. FIG. 2 shows the characteristics of boiling in liquid helium, of which data are plotted, with heat flux as the ordinate and temperature difference between liquid helium and the cooling face as the abscissa. The curve A gives the value of the original smooth surface of the composite superconductor, the curve B gives the value of the worked surface having rectangular sectional grooves of about 1 mm depth and about 1 mm width. The curve C' gives the value of the surface described in the preferred embodiments, i.e., which has the first grooves of 0.6 mm pitch and 0.4 mm depth, and the second grooves crossing the first grooves of 0.2 mm width, 0.8 mm depth and 0.4 mm pitch, and the curve C gives the value of the surface of the curve C' coated.

With increasing heat flux, heat transfer is initially achieved by nuclei boiling, but it changes from nuclei boiling to film boiling at a certain value of heat flux, $q_{max}$. In this point, decreasing the heat flux, it reverts from film boiling to nuclei boiling again at a certain value of heat flux, $q_{min}$.

When the temperature of a composite superconductor is raised for some cause and it shifts into the range of film boiling, it is preferable, in addition to a high level of $q_{max}$, to raise the level of $q_{min}$ as high as possible for rapidly recovering the superconductivity by eliminating the cause. Both $q_{max}$ and $q_{min}$ of the curve B indicate a high value, thereby the effect of the roughed surface of the composite superconductor can be recognized. However, the difference between $q_{max}$ and $q_{min}$ is not appreciably small. On the other hand, $q_{min}$ of the curve C is close to $q_{max}$.

Such a tendency was also observed in the case of forming a film of copper sulfide on the roughed surface described above by treating it with an aqueous solution of calcium sulfide, or in the case of coating it with a nickel thin film by employing a plating process.

This may be attributed to the particular surface structure as shown in FIG. 1, and to the high heat resistance of the coating or film constituting the outermost layer thereof. That is, in film boiling, it is considered that the vapor film of a refrigerant covering the surface of the substrate is swaying constantly, and is very thin or even absent locally. In this portion, nuclei boiling develops temporarily, but in the case of the surface of a highly heat conductive metal, the temperature of such portion does not so markedly drop and immediately it reverts to a film boiling state, and it does not reach a nuclei boiling state unless the heat load is lowered.

However, if the surface of the metal is coated with a highly heat resistant film, its temperature will drop locally and consequently the nuclei boiling state may be maintained for a certain period even if the heat load was such as to otherwise cause film boiling. The surface becomes, on the whole, a coexistent state of nuclei boiling and film boiling, and the level of $q_{min}$ is raised, compared to the case without the highly heat resistant film 6.

If this highly heat resistant film 6 is finely roughened or is porous to such an extent that it functions as a boiling nuclei for liquid helium, the level of $q_{max}$ will be raised.

Therefore, the composite superconductor having such a cooling face is capable of rapidly reverting even from the normal conducting state induced by some cause to a superconducting state without a sudden increase of temperatures.

As described above, according to the present invention, a high critical heat flux in film boiling and hence a high cooling capability for a stabilization design of the composite superconductor can be obtained, thereby making it possible to decrease the sectional area of the normal conducting material, to increase the effective current density, to miniaturize the size of a superconducting magnet, and the like.

Although the present invention has been described with reference to preferred embodiments thereof, many modifications and alterations may be made within the spirit and scope of the present invention.

What is claim is:

1. A composite superconductor including super-conducting material embedded in normal conducting material and having a surface adapted to be contacted by a refrigerant to cool said composite superconductor, said composite super-conductor further comprising:
   a plurality of closely spaced grooves formed in said surface;
   a plurality of ridges spaced from each other and defined by said grooves, each said ridge having an outer, acutely tapered end portion;
   at least said acutely tapered end portion of each of said ridges having formed therein a plurality of closely spaced notches; and
   at least a portion of the surfaces of said grooves, said ridges and said notches being coated with a thin film of metal or metallic compound having a higher heat resistance than that of said normal conducting material.

2. A composite superconductor as claimed in claim 1, wherein a plurality of members of said superconducting material extend longitudinally through said normal conducting material, and said grooves extend in directions orthogonal to said members of superconducting material.

3. A composite superconductor as claimed in claim 1, wherein said notches are substantially V-shaped.

4. A composite superconductor as claimed in claim 1, wherein the depth of said notches is shallower than that of said grooves.

5. A composite superconductor as claimed in claim 1, wherein said thin film comprises a compound of said normal conducting material.

6. A composite superconductor as claimed in claim 5, wherein said normal conducting material comprises copper.

7. A composite superconductor as claimed in claim 1, wherein said grooves and said ridges are formed on a surface of said normal conducting material.

8. A composite superconductor as claimed in claim 1, wherein said composite superconductor has a rectangular cross-section, and said grooves and said ridges are formed on the surface of one side of said section.

9. A composite superconductor as claimed in claim 1, wherein a plurality of members of said superconducting material are embedded in said normal conducting material, said normal conducting material has a rectangular cross-section, said grooves and said ridges are directly formed on the surface of one side of the rectangle, and said film comprises a compound of said normal conducting material.

* * * * *